Jan. 26, 1943.   M. D. WALKLET   2,309,368
BUMPER GUARD CONSTRUCTION
Filed Aug. 10, 1940   2 Sheets-Sheet 1

INVENTOR
MERCER D. WALKLET
BY
ATTORNEYS

Jan. 26, 1943. M. D. WALKLET 2,309,368
BUMPER GUARD CONSTRUCTION
Filed Aug. 10, 1940 2 Sheets-Sheet 2

INVENTOR
MERCER D. WALKLET
BY
ATTORNEYS

Patented Jan. 26, 1943

2,309,368

UNITED STATES PATENT OFFICE 2,309,368

BUMPER GUARD CONSTRUCTION

Mercer D. Walklet, Akron, Ohio, assignor, by mesne assignments, to American Chain & Cable Company, Inc., a corporation of New York Application August 10, 1940, Serial No. 352,096

10 Claims. (Cl. 293—55)

The present invention relates to bumper guards for automobiles and particularly to that type of guard which is mounted directly upon the bumper bar and extends across and protects the entire front of the automobile.

Bumper guards of this general type are not standard equipment on all automobiles and many automobile owners whose automobiles are not equipped with this general type of guard purchase it for attachment to their bumper equipment. Bumper bars found on different makes of cars may and usually do have different longitudinal curvatures which makes it necessary for a dealer to stock up with many forms of rigid bumper guards of this overall type if he desires to have on hand bumper guards which can be mounted upon these different types of bumper bars.

Among the objects of this invention is the provision of a full width bumper guard which comprises rigid elements flexibly interconnected in order that the same may be fitted to bumper bars of different longitudinal curvatures and which will provide a rigid guard which will be of adequate protection and will be free from objectionable rattle and will function in all respects similar to rigid guard constructions of the same general type.

In the drawings in which the best known and preferred form of the invention is shown:

Figure 3 is a similar plan view showing the manner in which the bumper guard is adapted to a bumper bar with a shorter radius of longitudinal curvature;

Figure 4 is a longitudinal section on the line 4—4 of Fig. 1 showing the construction of the bumper guard at the center post or upright member;

Figure 5 is a detail on the line 5—5 of Fig. 4; and

Figure 6 is a section on the line 6—6 of Fig. 3 showing a detail of a rattle preventing device employed when the bumper guard is composed of a plurality of horizontal bars.

While the drawings and the description are for the purpose of explaining the invention in the form illustrated, the details are not essential and may be varied without departing from the invention.

Figure 1:
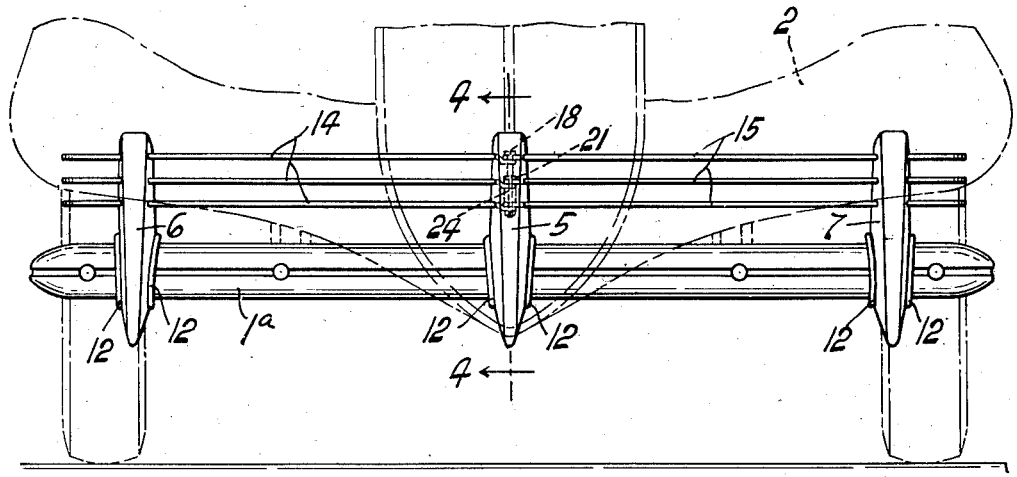
Figure 1 is a front elevation showing the manner in which the invention is embodied in a full-width bumper guard mounted upon the front bumper bar of an automobile.
Figure 2:
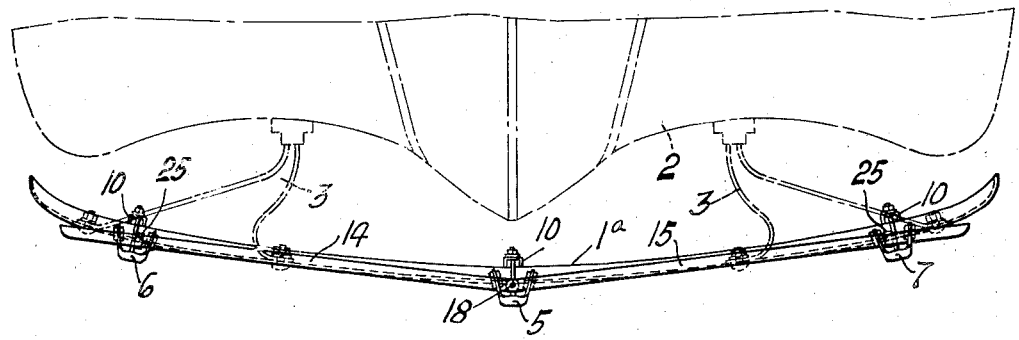
Figure 2 is a plan view showing the bumper guard as applied to a bumper bar with a long radius of longitudinal curvature.

In the drawings two bumper bars of different longitudinal contour are shown, that illustrated in Figs. 1 and 2 and designated as 1a being of a smaller degree of curvature than that shown in Fig. 3 and designated as 1b. The same bumper guard is shown on each bumper bar, these views illustrating the manner in which the bumper guard is flexed so that it may be adapted to either extreme curvature. The bumper bars are secured to the automobile 2 by any standard mounting illustrated diagrammatically at 3.

The bumper guard shown herein consists of a central post or vertical member 5 and two side posts 6 and 7 which are secured to the bumper bar by two bolts 8 and 9 and a clamp plate 10. These posts are formed from sheet metal and are provided with hollowed interiors in accordance with accepted designs. Between the flanges of the posts and the bumper bar are preferably located adapter members here shown as rubber strips 12 which close any gaps between the rear edges of the flanges and the front face of the bumper bar.

Mounted in the posts are shown a plurality of rigid horizontal guard bars, here shown as three in number, but this number of guard bars is not essential and one or more may be employed.

As shown, the guard bars are in sets on opposite sides of the central post 5, those at the left being indicated by the numeral 14 and those at the right by the numeral 15. The guard bars pass through the sidewalls of the posts as shown, the apertures in each post being sufficiently large to permit the requisite relative pivotal movement of the sets of guard bars to adapt the bumper guard to any curvature of bumper bar which may be encountered in actual service. Figure 5 shows the apertures at the central post to provide the requisite clearance, it being desirable to form notches 16 in the guard bars to secure greater freedom of movement.

In the center post the two sets of horizontal guard bars are connected by a pin 18 which passes through the ends of both sets of guard bars, the guard bars 14 being shown as offset to maintain the transverse alignment of the guard bars on opposite sides of the center post. It will be seen that this pivotal arrangement permits the entire bumper guard to be flexed sufficiently so that the end posts 6 and 7 may be attached near the ends of either bumper bar 1a or 1b or any bumper bar of greater or less curvature.

In order to prevent objectionable rattle at the point where the guard bars are pivoted together, resilient means is provided to prevent relative vibration of the guard bars. For this purpose the pin 18 is formed with an enlarged portion at its upper end where it passes through the upper pair of guard bars and with a reduced portion where it passes through the two lower pairs of guard bars, the intermediate shoulder 20 being spaced sufficiently to accommodate a cupped spring washer 21. The lower end of the pin is threaded and provided with the nut 22 and surrounding the pin between the lower guard bars is a sleeve 24. On tightening the nut 22 the spring 21 is compressed exerting a constant pressure against the middle pair of guard bars to prevent chatter.

In order to prevent relative pivotal movement of the several guard bars in service a flat spring plate 25 is interlaced between the several guard bars of each set as shown in Fig. 6. This plate 25 is preferably located within the recessed portion of the end posts 6 and 7.

It will be seen that a bumper guard has been provided which extends across the width of the automobile and will conform to the curvature of any bumper bar which it may be required to fit and the entire assembly is not only neat and attractive in appearance but is free from rattle. The entire assembly is strong and sufficiently rigid to withstand any blows which are normally encountered and will fully protect the front or rear of the automobile. The various details of spring holding means may be varied and the design of pivotal connection may be altered without in any way departing from the principles of the invention.

What is claimed is:

1. A bumper guard adapted to be attached to a longitudinally curved bumper bar, said guard comprising a central post and side posts located near the ends of the bumper bar, said posts being rigidly fixed on the bumper bar, rigid horizontal guard bars extending through the posts, and a pivotal connection between the guard bars at the central post.

2. In a bumper guard construction, the combination of a curved bumper bar, a hollow post attached directly to the center of the bumper bar, two posts attached directly to the bumper bar on opposite sides of the hollow post, guard bars extending between the center post and the side posts, and a flexible connection between the guard bars located within the hollow post.

3. In a bumper construction, the combination of a longitudinally curved bumper bar, a post at the center of the bumper bar having side flanges and an open body portion, guard bars extending through the side flanges and overlapping in the body of the post, a pivot within the body portion connecting said guard bars, and means for securing the opposite ends of the guard bars to the bumper bar.

4. In a bumper guard construction, a central post and side posts, two sets of parallel bars each set being attached to the central post and a side post, a pivotal connection between the sets of bars which permits relative angular positions of the bars, and spring means located at the pivotal connection and bearing against the bars.

5. In a bumper guard construction, a central post and side posts, said central post having a hollow body portion, sets of parallel bars extending across the posts, each set being received in the central post, and a pivot pin in the body portion extending through overlapped portions of the bars.

6. In a bumper guard construction, a central post and side posts, said central post having a hollow body portion, sets of parallel bars extending across the posts, each set being received in the central post, a pivot pin in the body portion extending through overlapped portions of the bars, and a resilient means to hold the overlapping portions of the bars against rattling.

7. In a bumper guard construction, a central post and side posts, said central post having a hollow body portion, sets of parallel bars extending across the posts, each set being received in the central post, a pivot pin in the body portion extending through overlapped portions of the bars, and resilient means to hold the bars against rattling throughout their length.

8. In a bumper guard, sets of parallel bars pivotally connected at the center of the guard, and means to support said bars in the vertical plane of the bumper bar, said pivotal connection permitting the guard to be mounted so as to overlie and substantially parallel bumper bars of varying longitudinal curvatures.

9. In a bumper guard, sets of parallel bars pivotally connected at the center of the guard, and means to support said bars in the vertical plane of the bumper bar, said pivotal connection permitting the guard to be mounted so as to overlie and substantially parallel bumper bars of varying longitudinal curvatures, and means to hold said bars against rattling at the pivotal connection and at their opposite ends.

10. In a bumper guard, sets of parallel bars pivotally connected at the center of the guard, means to support said bars in the vertical plane of the bumper bar, said pivotal connection permitting the guard to be mounted so as to overlie and substantially parallel bumper bars of varying longitudinal curvatures, and resilient means to hold said bars against rattling at the pivotal connection and at their opposite ends.

MERCER D. WALKLET.